United States Patent [19]

Smith

[11] Patent Number: 4,955,634
[45] Date of Patent: Sep. 11, 1990

[54] WHEEL SUSPENSION LINKAGE

[76] Inventor: Stephen L. Smith, 5406 Timber Pond, San Antonio, Tex. 78250

[21] Appl. No.: 383,727

[22] Filed: Jul. 24, 1989

[51] Int. Cl.$^5$ .......................... B62D 7/06; B60G 3/18
[52] U.S. Cl. ...................................... 280/675; 280/661
[58] Field of Search ........................ 280/661, 673, 675

[56] References Cited

U.S. PATENT DOCUMENTS

| | | | |
|---|---|---|---|
| 2,767,998 | 10/1956 | Powell | 280/675 |
| 3,680,881 | 8/1972 | Douglas | 280/675 |
| 3,711,113 | 1/1973 | Stammreich | 280/675 |
| 4,236,728 | 12/1980 | Policy et al. | 280/661 |

FOREIGN PATENT DOCUMENTS 125907 6/1987 Japan .................................. 280/675

*Primary Examiner*—Kenneth R. Rice
*Attorney, Agent, or Firm*—Hubbard, Thurman, Turner, Tucker

[57] ABSTRACT

A linkage is provided for interconnecting two horizontally spaced bodies so that relative vertical movement of the two bodies occurs in a linear path. The linkage comprises a link member having universal pivotal connection to one of the bodies, for example the wheel hub of an automobile. The other end of the link is deformed into a vertical planar configuration and defines a vertically curved slot and a horizontal slot horizontally spaced from the vertically curved slot. Two horizontal pins are rigidly affixed to the other body, for example the chassis or frame of the automobile, and respectively traverse the vertically curved and horizontal slots with the result that the wheel hub can only move in a generally vertical direction relative to the frame along a linear path.

10 Claims, 2 Drawing Sheets

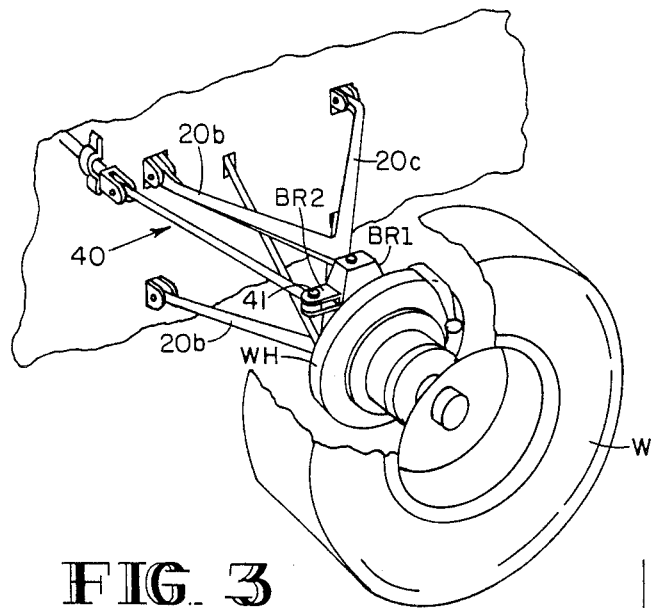
FIG. 3
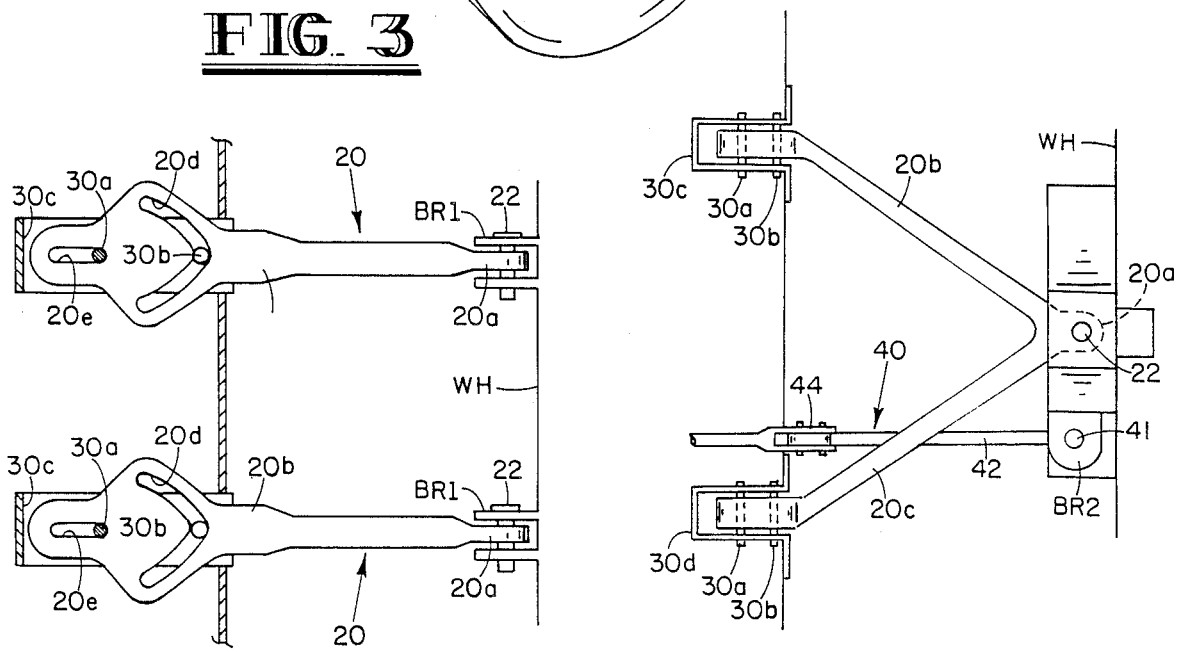
FIG. 5
FIG. 4
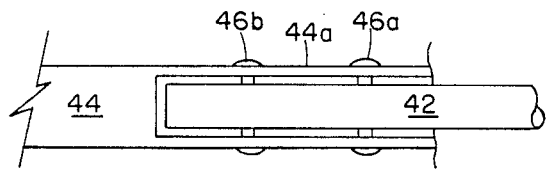
FIG. 6A
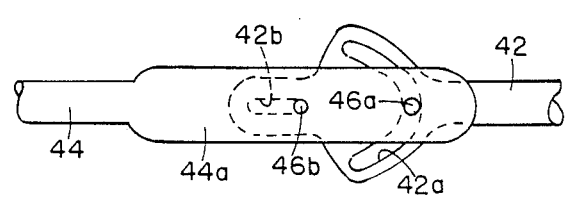
FIG. 6B

WHEEL SUSPENSION LINKAGE

BACKGROUND OF THE INVENTION

1. FIELD OF THE INVENTION

The invention relates to an improved linkage for interconnecting two horizontally spaced bodies for linear relative vertical movements, for example, the wheel hub and the frame or chassis of an automotive vehicle.

2. SUMMARY OF THE PRIOR ART

Individual wheel suspensions for automotive vehicles have long been known in the art. Likewise, the requirement that the wheel move vertically relative to the chassis in a substantially vertical path has been specifically disclosed in several prior art patents. For example, see U.S. Pat. Nos. #2,064,824 to SANFORD, #2,767,998 to POWELL and #3,711,113 to STAMMREICH. While these patents disclose the desirability of providing a wheel mounting linkage for an automotive vehicle which will restrain the vertical movements of the wheel hub relative to the chassis to a linear path, the linkage arrangements disclosed in such prior art are unduly complicated and expensive to manufacture. The complexities and significant cost of manufacture of the structures disclosed by each of the aforementioned patents will be readily confirmed by those skilled in the art by simply looking at these prior art disclosures. There remains, therefore, a need for a simple, rugged, yet economically manufacturable linkage for effecting the connection of a wheel hub to an automotive chassis or any two horizontally spaced bodies wherein it is desired to constrain the relative vertical movement of the two bodies to a linear path.

SUMMARY OF THE INVENTION

The invention in its broadest aspects comprises a linkage having one end connected by a universal joint to a wheel hub and the other end deformed into a vertical planar configuration. The planar portion is provided with a curved vertical slot and, additionally, with a horizontal slot horizontally spaced from the vertical slot. A pair of pins are then fixedly mounted to the chassis and respectively engage the horizontal and vertical curved slots. With this arrangement, any vertical movement of the end of the link connected to the wheel hub is constrained to move in a linear path.

In a modification of the invention, the linkage may comprise a wishbone configuration wherein the stem portion of the wishbone is connected by a universal pivot to the wheel hub and the two arm portions have their ends deformed to a planar vertical configuration. Again, the planar vertical portions of each arm of the wishbone link define a vertically extending curved slot and a horizontal slot horizontally spaced from the vertical slot. Two pairs of horizontal pins are fixedly mounted on the chassis to respectively engage the slots in each of the ends of the wishbone link.

For utmost rigidly of support of the wheel hub, the aforementioned wishbone linkage may be attached by a universal pivot to the top portion of the wheel hub while a second wishbone linkage, identical to that already described, is connected by a universal pivot to the bottom portion of the wheel hub. Thus the two wishbone links form a generally parallelogram support structure for the wheels when viewed in a vertical planar. Springs or shock absorbers may be mounted between the linkage and the frame in conventional fashion.

Those skilled in the art will recognize that whenever a wheel hub is thus constrained for vertical movement in a linear path relative to the chassis, a modified steering linkage must be provided to accommodate such vertical movement. Such modified steering linkage might also comprise a link having one end connected by a universal pivot joint to the wheel at a location spaced from the vertical axis of the hub connections of the wishbone links, and the other end of the primary steering link being deformed into a vertical planar configuration and having a vertically curved slot and a horizontal slot spaced from the vertical curved slot in the same manner as the ends of the wishbone links. The two pins that cooperate with such slots are fixedly mounted in the bifurcated end of a secondary link which connects to the steering lever conventionally provided on automotive vehicles.

It will therefore be obvious to those skilled in the art that the principles of this invention may be utilized to control the relative vertical movements of any two horizontally spaced bodies so that such relative vertical movements are restricted to a linear displacement.

Further objects and advantages of the invention will be readily apparent to those skilled in the art from the following detailed description, taken in conjunction with the annexed sheets of drawings on which are shown several preferred embodiments of the invention.

BRIEF DESCRIPTION OF THE DRAWINGS

FIG. 3 is a perspective view, with parts broken away for clarity showing the utilization of this invention as an automotive wheel suspension linkage.

FIG. 4 is a top plan view of the linkage employed in FIG. 3.

FIG. 5 is a side elevational view of the linkage employed in FIG. 3.

FIG. 6A is a plan view of a steering linkage which may be employed in the suspension system of FIG. 3.

FIG. 6B is a side elevational view of FIG. 6A.

DESCRIPTION OF PREFERRED EMBODIMENTS

Figure 1:
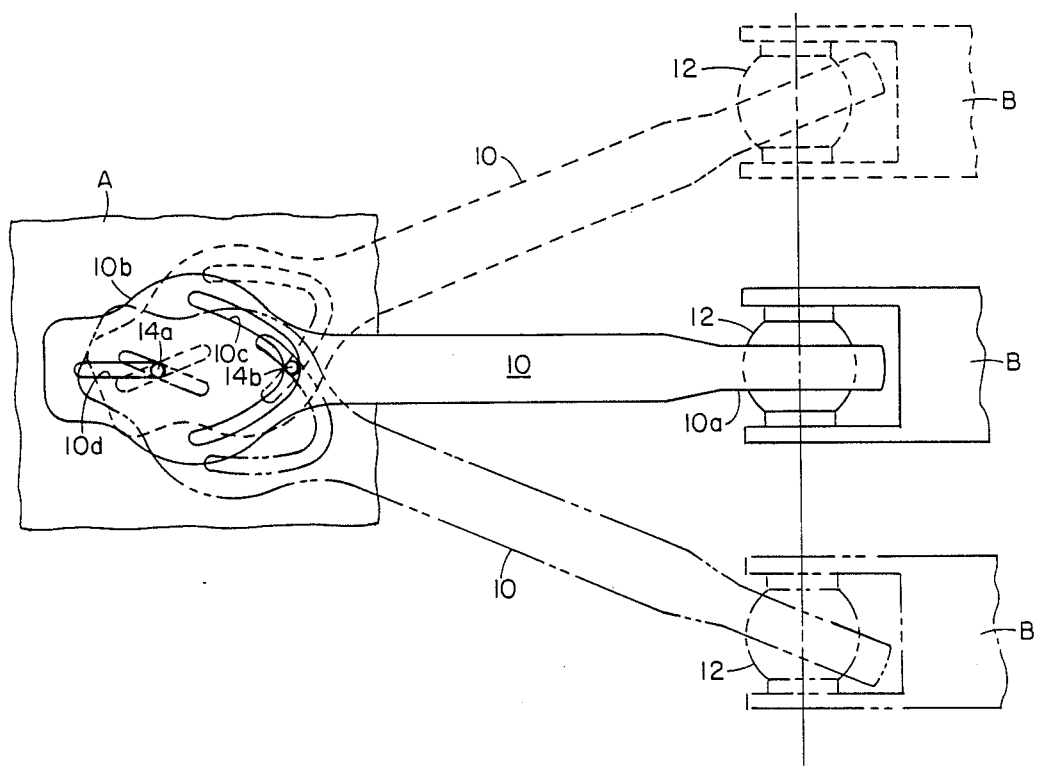
FIG. 1 is a schematic elevational view of a linkage embodying this invention illustrating the path of one end of the linkage relative to two pins which are fixedly secured on another body.

Referring to FIG. 1, there is schematically shown a linkage embodying this invention for connecting a first body A to a second body B which is horizontally spaced from body A so that any relative vertical movement of body B relative with respect to the body A occurs in a substantially vertical straight line. Such linkage comprises a primary link 10 having one end 10a pivotally secured by a conventional universal pivot joint 12 to the body B. The other end of primary link 10 has an enlarged vertical planar configuration as indicated at 10b. A vertically disposed curved slot 10c is formed in the planar end portion 10b. Additionally, a horizontal slot 10d is formed in such planar end portion and is horizontally spaced from the concave side of the vertical curved slot 10c. A pair of pivot pins 14a and 14b are fixedly secured to the body A, and in the neutral position of the linkage, indicated by the solid lines in FIG. 1, the pins 14a and 14b are respectively at one end of the horizontal slot 10d and in the center portion of the curved vertical slot 10c.

As the body B moves vertically relative to the body A, the two pivot pins 14a and 14b and the vertical and horizontal slots 10c and 10d control the effective length of the primary link 10 relative to its pivot mounting on pins 14a and 14b so that the end 10a of the primary link 10 moves in a generally vertical but linear path, thus constraining the movement of body B to a generally vertical linear path. It will be noted that the curvature of the vertical curved slot 10c approximates a semielliptical configuration. Thus, as the second body B moves vertically with respect to the first body A, the pin 14b in the curved slot will cause the link 10 to effectively elongate, thus moving the position of the second pin 14a in the horizontal slot 10d as indicated by the dotted lines in FIG. 1.

Of course, the pins 14a and 14b may be horizontally spaced in the link 10 and the curved slot 10c and horizontal slot 10d may be formed in the body A.

Figure 2:
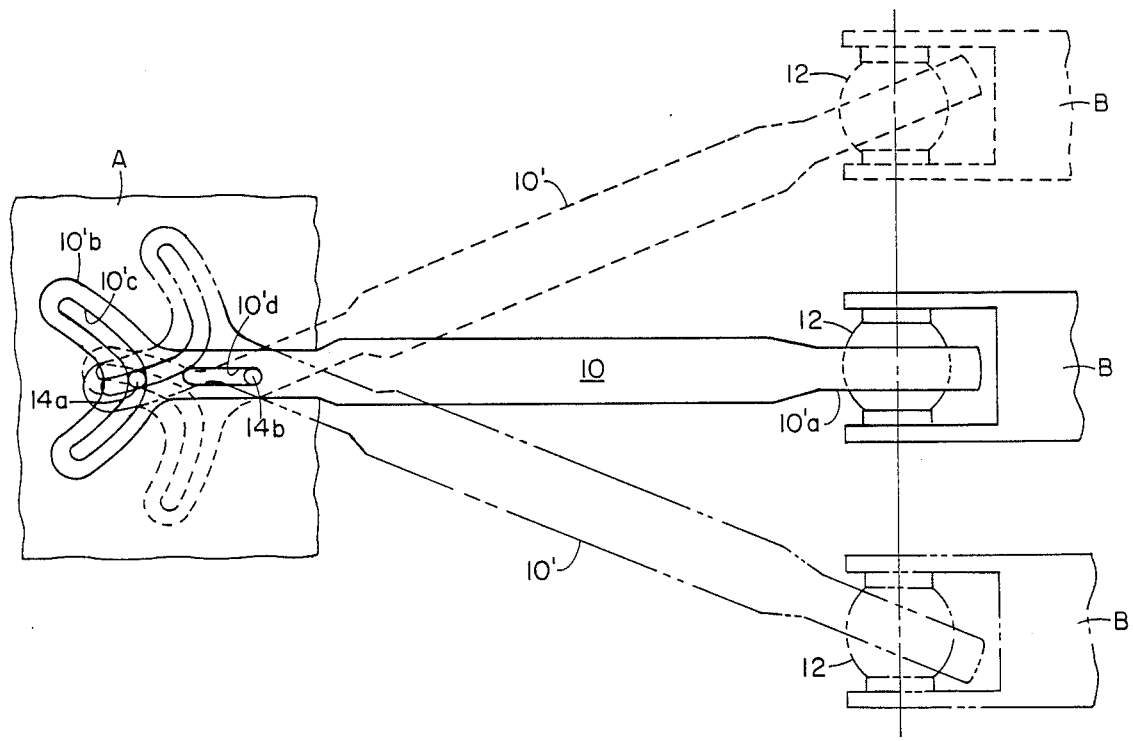
FIG. 2 is a view similar to FIG. 1 but illustrates the disposition of a horizontal slot on the convex side of the vertically curved slot, in contrast to FIG. 1 wherein the horizontal slot is adjacent the concave side of the vertically curved slot.

Referring to FIG. 2, there is shown an alternate embodiment of this invention wherein the vertical curved slot 10'c is formed in the extreme end portion of the primary link 10' and the horizontal slot 10'd is horizontally spaced from the convex side of the vertical curved slot 10'c. This is in contrast to the arrangement of FIG. 1 wherein the horizontal slot 10d was horizontally spaced from the concave side of the vertical curved slot 10c. Regardless of this fact, the operation of the linkage is the same and the modified primary link 10' will cause the body B to move in a generally vertical linear path relative to the body A. In this arrangement, the fixed pin 14a engages the vertical curved slot 10'c while the other fixed pin 14b engages the horizontal slot 10'd.

The linkage embodying this invention may be advantageously employed to control the movements of a wheel relative to the frame or chassis or an automotive vehicle. Referring to FIG. 3, there is schematically shown a preferred form of such linkage for mounting a steerable wheel W for linear vertical movement relative to a chassis or frame F. As best shown in FIGS. 4 and 5, the primary linkage now comprises a yoke shaped member 20 having a stem portion 20a secured by a universal pivot joint 22 to a wheel hub WH by a conventional universal pivot connection to a mounting pin 22 which traverses an appropriate bracket BR1 formed on the wheel hub WH.

The other ends of the diverging arms 20b and 20c of the yoke shaped link 20 are of vertical planar configuration respectively secured to two horizontally spaced pairs of pins 30a and 30b which are respectively mounted in brackets 30c and 30d suitably formed or secured to the frame F. As best shown in FIG. 5, the planar vertical end portions of each of the yoke arms 20b and 20c are each provided with a vertical curved slot 20d and a horizontal slot 20e. These slots are respectively traversed by the horizontally spaced, fixedly mounted pins 30a and 30b. Again, the slots may be formed on the brackets and the pins mounted on the yoke arms 20b and 20c.

It is preferable that the wheel hub WH be supported at more than one point and hence a pair of vertically spaced linkages 20 may be employed, as shown in FIG. 5 of the drawings. Each linkage 20 is preferably identical to that previously described so it will be readily apparent to those skilled in the art that the wheel hub WH is constrained for movement relative to the vehicle frame F to move only in a substantially vertical linear path, thus eliminating excessive tire wear as the wheels of the vehicle traverse an obstruction, or the vehicle rounds a curve and causes a vertical displacement of the wheel hub WH with respect to the chassis or frame F.

If the wheel W is a steerable wheel of the vehicle, a linkage 40 which is preferably identical to either the linkage 10 of FIG. 1 or the linkage 10' of FIG. 2 may be utilized to connect the wheel hub WH to a conventional steering lever (not shown). Thus, referring to FIGS. 4, 6A and 6B, the steering linkage 40 may comprise a first link 42 which is universally pivotally connected to the wheel hub WH by a pivot pin 41 which traverses a second bracket BR2 formed on the wheel hub WH. The other end of the primary link 42 is provided with a planar vertical configuration as shown in FIG. 6B and this end portion is machined to provide a vertical curved slot 42a and a horizontally spaced horizontal slot 42b. A secondary link 44, which extends to a conventional connection with a steering lever of the vehicle, has a bifurcated end portion 44a which is traversed by two horizontally spaced pins 46a and 46b. The pin 46a traverses the vertical curved slot 42a while the pin 46b traverses the horizontal slot 42b. It will therefore be apparent that the steering linkage 40 will expand or contract as the wheel W moves vertically with respect to the frame or chassis F in a substantially straight line and thus no interference with such linear vertical movement is provided by the steering linkage 40.

Those skilled in the art will recognize that the principles of this invention may be applied to any application wherein it is desired that two horizontally spaced bodies be relatively movable vertically but constrained for such movement so that one body moves in a substantially vertical linear path. Furthermore, the use of the terms horizontal and vertical are merely relative and are adopted solely for the ease of description of the linkage and should not in any manner be considered as limiting the scope of the invention.

The determination of the exact curvature of the vertical curved slot may be performed by any draftsman. Once the extent of vertical movement of body A relative to body B is selected and the location of the two pins (14a and 14b in FIG. 1) the length of the primary link 10 is established for the midpoint or neutral position of bodies A and B. Then as bodies A and B are relatively moved in a linear vertical path, the necessary length of the horizontal slot is determined as well as the positions of the vertical slot pin relative to the primary link, thus plotting the vertical curved slot.

If a slightly non-linear path is desired, this may be accomplished by the designer changing the shape of the curved slots.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A wheel suspension system for an automotive vehicle having a frame and a plurality of wheels, each wheel including a hub unit, the improvement comprising:
   a wishbone link for connecting the wheel hub to the frame;
   said wishbone link having a stem portion and two diverging arm portions;
   universal joint means for connecting the end of said stem portion to said wheel hub;
   the other end of each of said arm portion defining a curved slot in a vertical plane and a horizontal slot adjacent said curved slot;
   bracket means on said frame;
   a pair of horizontal pins fixedly mounted in transversely spaced relationship to said frame and respectively engagable with said vertical curved slot and said horizontal slot;
   the curvature of said curved slot and the spacing of said pins being selected to cause the end of said stem portion of said wishbone link to move in a substantially vertical linear path relative to said frame.

2. A wheel suspension system for an automotive vehicle having a frame and a plurality of wheels, each wheel including a hub unit, the improvement comprising:
   a pair of wishbone links for connecting a wheel hub to the frame;
   each said wishbone link having a stem portion and two diverging arm portions;
   universal joint means for connecting the ends of said stem portions to said wheel hub in spaced relation;
   the outer end of each said arm portion defining a curved slot in a vertical plane and a horizontal slot adjacent said curved slot;
   four spaced bracket means on said frame;
   four pairs of horizontal pins fixedly mounted in transversely spaced relationship to said bracket means, the pins of each pair being respectively engagable with said vertical curved slot and said horizontal slot in one of said arm portions;
   the curvature of each said curved slot and the spacing of each of said pairs of pins being selected to cause the end of said stem portion of said respective wishbone link to move in a substantially vertical linear path relative to said frame.

3. The apparatus of claim 1 further comprising:
   a steering link connected at one end to said wheel hub by a universal pivot;
   the other end of said steering link having a vertical planar configuration and defining a curved slot in a vertical plane and a laterally spaced horizontal slot;
   a steering arm connecting link having a bifurcated end straddling said vertical planar end of said steering link; and
   a pair of pins fixedly mounted in said bifurcated end portion and respectively traversing said curved vertical slot and said horizontal slot, the curvatures of said curved vertical slot and the spacing of said pins being selected to permit said steering link to follow the generally vertical linear movements of said wheel hub relative to said chassis.

4. The apparatus of claim 2 further comprising:
   a steering link connected at one end to said wheel hub by a universal pivot;
   the other end of said steering link having a vertical planar configuration and defining a curved slot in a vertical plane and a laterally spaced horizontal slot;
   a steering arm connecting link having a bifurcated end straddling said vertical planar end of said steering link; and
   a pair of pins fixedly mounted in said bifurcated end portion and respectively traversing said last mentioned curved vertical slot and said last mentioned horizontal slot, the curvatures of said last mentioned curved vertical slot and the spacing of said last mentioned pins being selected to permit said steering link to follow the generally vertical, linear movements of said wheel hub relative to said chassis.

5. A linkage for connecting two horizontally spaced bodies for linear movement generally perpendicular to the spacing between said bodies comprising:
   an elongated link;
   horizontal pivot means for connecting one end of said link to one of said bodies;
   the other end of said link having a generally vertical planar configuration;
   a vertically curved slot and a horizontal slot in said vertical planar end portion of said link;
   said horizontal slot being horizontally spaced from said vertical curved slot; and
   a pair of horizontally spaced pins fixedly mounted on said other body and respectively traversing said slots.

6. The apparatus of claim 5 wherein said vertical curved slot is semi-elliptical, the length of said vertical curved slot thereby limiting the linear movement of said one body in both directions by the engagement of said pin traversing said vertical curved slot by engagement with the ends of said vertical curved slot.

7. The apparatus of claim 6 wherein the length of said horizontal slot is selected to permit said pin traversing said horizontal slot to move from one end of said horizontal slot to the other as the other said pin moves from one end to the other end of said vertical curved slot.

8. The apparatus of claim 5 wherein one of said bodies comprises a vehicle chassis and the other body comprises a wheel hub.

9. The apparatus of claim 6 wherein one of said bodies comprises a vehicle chassis and the other body comprises a wheel hub.

10. The apparatus of claim 7 wherein one of said bodies comprises a vehicle chassis and the other body comprises a wheel hub.

* * * * *